May 5, 1931.   H. T. LUMB   1,803,857
LUMBER RETURN ATTACHMENT FOR SAW TABLES
Filed May 1, 1930   2 Sheets-Sheet 1
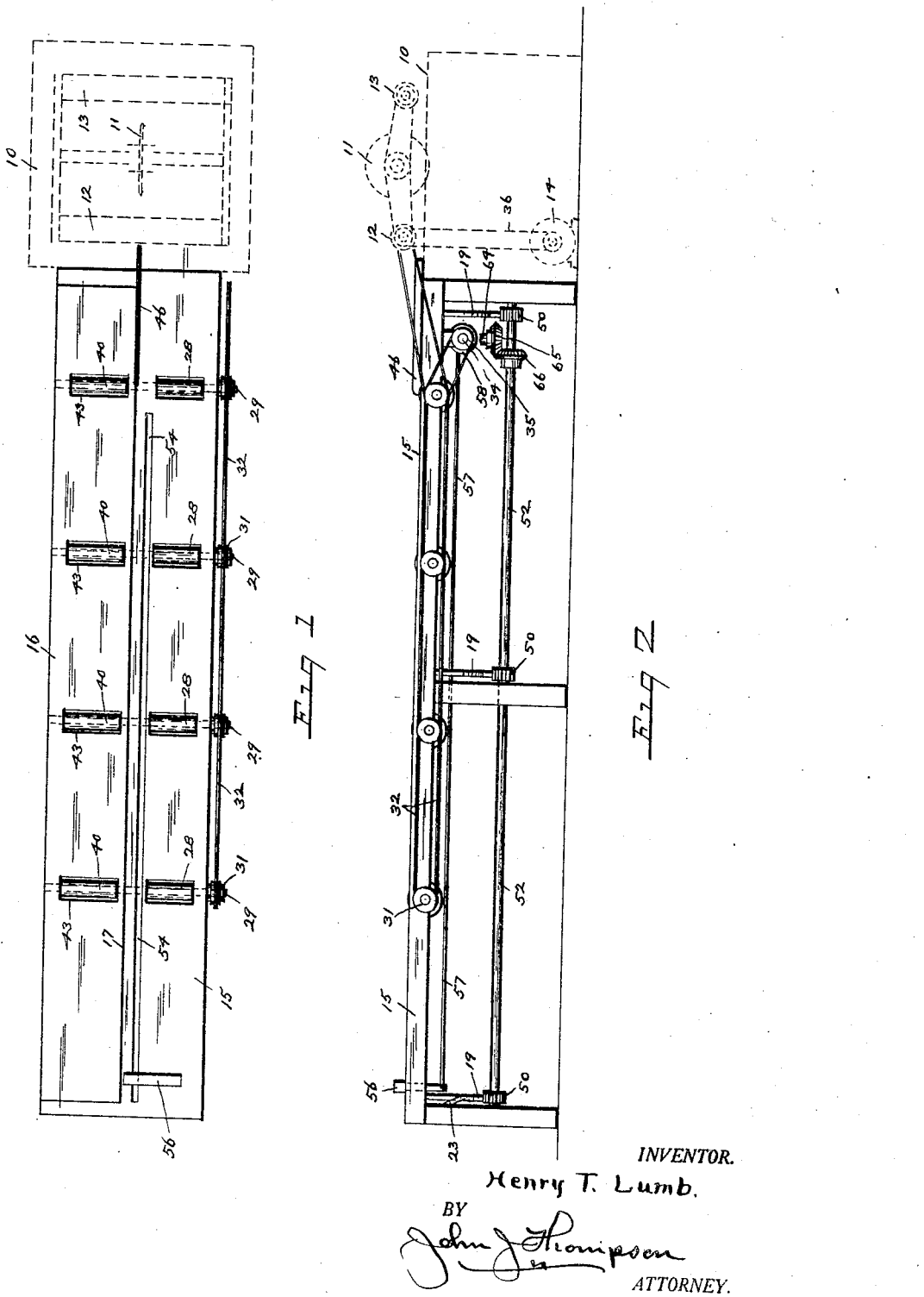
INVENTOR.
Henry T. Lumb.
BY
John J. Thompson
ATTORNEY.

May 5, 1931. H. T. LUMB 1,803,857
LUMBER RETURN ATTACHMENT FOR SAW TABLES
Filed May 1, 1930 2 Sheets-Sheet 2
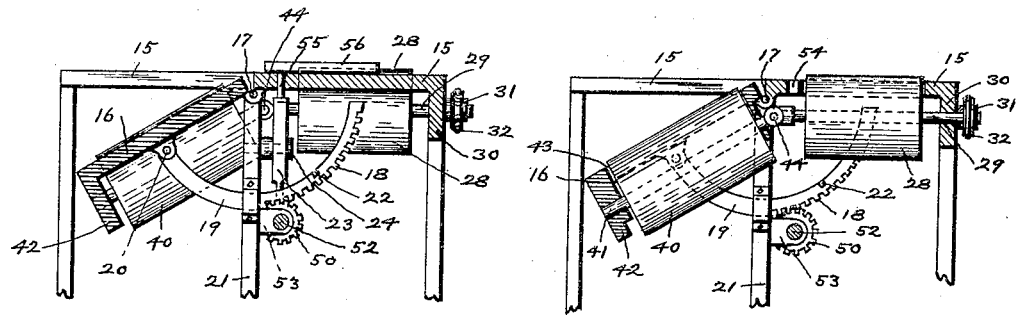
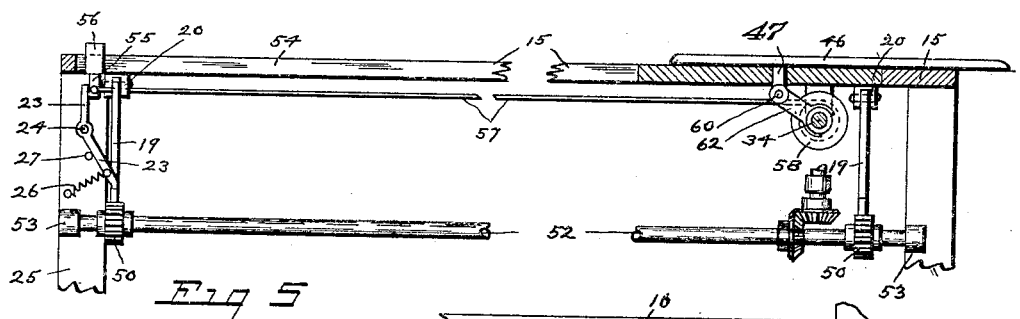
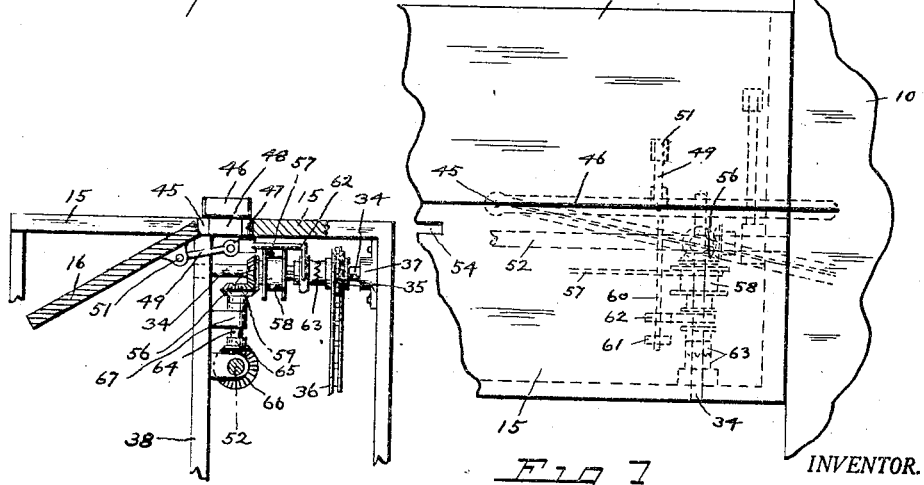
INVENTOR.
Henry T. Lumb.
BY John J. Thompson
ATTORNEY.

Patented May 5, 1931

1,803,857

UNITED STATES PATENT OFFICE

HENRY T. LUMB, OF POUGHKEEPSIE, NEW YORK

LUMBER RETURN ATTACHMENT FOR SAW TABLES

Application filed May 1, 1930. Serial No. 448,812.

This invention relates to a device in the form of an attachment for saw tables, to return the lumber or board to the feeding operator, to be again fed to the saw, while at the same time the "rips" or pieces which have been sawed from the board are delivered upon a truck or may be placed upon a conveyor to be transported to another machine.

In the ripping of lumber it requires two operators to a saw, one to feed the lumber to the saw, and the other to dispose of the "rip" and to return the lumber to the feeder for the next cut; all of which requires considerable time.

While I am aware that several machines have been devised for this purpose, they are not satisfactory in that the board is returned upon a different level than that of the saw table, and the feeder is required to place the board upon the saw table.

The object of the present invention is to provide an attachment for saw tables that shall be automatic in its action, and by novel means which is governed by the travel of the board upon the table, operate to deliver the "rips" and return the lumber or board which is being sawed to the feeder and in a position to be again fed to the saw, thus saving time and labor.

It is understood that this attachment may be secured to any standard rip saw table, having either the saw mounted above or below the table, and with the usual feed rollers.

With these and other objects in view, my invention consists in certain construction and combination of parts as will hereinafter be fully described and claimed, and illustrated in the accompanying drawings which form a part hereof and in which like figures of reference refer to corresponding parts in all of the views, but it is fully understood that slight changes may be made in the construction without departing from the spirit of the invention.

In the drawings:—

Figure 1 indicates a top plan view of the device as attached to a rip saw table.

Figure 2 is a side elevation of the same.

Figure 3 is a partial cross sectional view on an enlarged scale, showing the table operating means.

Figure 4 is a similar cross sectional view, to show the operation of the rollers.

Figure 5 is a longitudinal sectional view, to show the lumber return device.

Figure 6 is a cross sectional view, similar to Figure 3, to illustrate the guide operating means.

Figure 7 is a partial top plan view of the table, showing the guide and its operation.

Referring to the drawings:—

One of the standard designs of rip saw tables is indicated by the numeral 10, and this is provided with the usual saw 11, in this case located above the table, and the two lumber feed rollers 12 and 13, which are operated in some suitable manner.

My invention comprises the attachment, which is in the form of a table extending from and attached to the saw table 10 and on the same plane therewith, and consisting of the stationary member or table 15 and the movable or drop member 16 which is hinged as at 17 to the edge of the member 15 and in line with the saw 11.

This drop member 16 is provided with one or more curved arms 19 having one end hinged to the under side as at 20; and being passed through an orifice in the support or leg 21, and also formed with a locking notch 22 for the engagement of the lower end of a pivoted latch 23 which is pivoted as at 24 to the leg 25 and retained in a locked position by the spring 26, and a stop pin 27, and the lower edges of the curved arms 19 are formed with the teeth 18 which are in mesh with the pinions 50 which are secured on a shaft 52 which is rotatably mounted in the bearings 53 secured to the legs 21, 25 and 38.

For conveying the lumber from the saw and in connection with the feed rollers 12 and 13, there are provided a series of rollers 28 which may be covered with rubber or other suitable material and which are mounted on the transverse shafts 29 which are rotatably mounted in bearings in the side 30 of the table member 15; and the ends of said shafts 29 are extended through said side 30 and are provided with the pulleys 31 connected by the belt 32 and rotated by a drive from the roller 12 by a belt, and the countershaft 34 which is mounted near the upper end of said table member 15, is driven from a sprocket 35 mounted thereon and in turn driven by a chain from the rear pulley 31; said shaft 34 being mounted in the bearings 37 secured to the legs 38; said rollers 28 being so mounted that they will project slightly above the surface of the table member 15 through opening 39 formed therein.

In the movable or drop member 16 of the table there are mounted a similar series of rollers 40 on the shafts 41 which are mounted in the bearings 42 secured to the under side of said member 16 and said rollers 40 also project slightly above the surface of the member 16 through the openings 43 formed therein; the ends of the shafts 41 being secured to the ends of the shafts 29 by the universal joints 44 which will allow the rollers 40 to swing with the drop member 16 and still be rotated with the rollers 28.

Adjacent to the saw 11 and the table 10, and having its rear end pivoted as at 45 to the table member 15 is a guide strip 46 of thin material suitable to follow after the saw in the saw cut, and designed to act as a switch to divert the returning board past the saw.

Said guide strip 46 is provided with a depending lug 47 projecting through a slot 48 formed in the table member 15; and to this lug 47 is pivoted one end of a link 49 which has its other end pivoted to the under side of the table member 16 as at 51 in such a manner that as the member 16 swings down it will push the guide strip 46 into the position as shown by the dotted lines in Figure 7.

These devices are operated in an automatic manner by the travel of the lumber in the following manner:—

The table member 15 is formed with a longitudinal slot 54 within which is slidably mounted a lug 55 formed with a foot 56 adapted to be engaged by the end of the board and carried down said slot 54 as the lumber is carried by the rollers 28 and 40; and to this lug 55 is secured one end of a cable 57 while the other end is mounted on a drum 58 which is secured upon the shaft 34.

As the lumber is carried down the table on the rollers 28 and 40 and in turn pushes the foot 56 before it and the lug 55, when it reaches the end of the slot 54 the lug 55 will contact with and move the lever 23 releasing the same from the notch 22 of the arm 19 allowing the drop member 16 to swing downward and carry the "rip" with it, and at the same time the member 16 will move the attached link 49 and guide strip 46 over so that the returning board will strike it and be guided past the saw; the board being returned by the winding up of the cable 57 upon the drum 58 in the following manner.

To the guide strip lug 47 is secured the end of a rod 60 which is adapted to slide within the bearing 61 secured to the under side of the member 15, as the guide 46 is moved, and to this rod 60 is secured a clutch lever 62 which operates the clutch 63 to engage the drum 58 with the shaft 34 to rotate the drum and wind up the cable 57 upon it, thus drawing up the foot 56 and with it the board, thus allowing the foot 56 to be in position to be again carried downward by the next cut of the board; the drop portion of the table 16 and the guide strip 46 having been returned to their normal positions, through the action of a bevel gear 56 which is secured on a shaft 34, and driving a bevel gear 59 secured on one end of a vertical shaft 64 mounted in a bearing 67 on the leg 38 and which has a bevel gear 65 on its lower end and in mesh with and driving a bevel gear 66 secured on the shaft 52, thus raising and returning the drop member 16 to its normal or raised position, and it will be seen that as the member 16 reaches its normal or level position the link 49 will return the guide 46 to its original position and at the same time disengage the clutch 63 and stop the winding up of the cable, allowing it to be freely carried out by the foot with the next cut of the board, and also the notch 23 will be engaged by the catch 23 as it comes into registry with it, thus locking the drop member 16 until again tripped.

While only the rollers 28 and 40 are shown for carrying the lumber, it may be found necessary to provide a suitable pressure roll to insure perfect contact between the lumber and the rolls 28 and 40, or in place of the rollers 28 and 40 it may be found to advantage to employ some form of conveyor to carry the lumber down the length of the table.

Having thus described my invention, what I claim as new and desire to secure by Letters Patent, is:—

1. In a device of the class described and in combination with a saw and table; of a delivery table mounted on the same plane as said saw table and comprising a stationary member and a movable member, means for carrying the lumber out upon said members, means actuated by the travel of said lumber for allowing the movable member to swing downward, means for returning the lumber to the saw table, means for diverting its line of travel past the saw, and means for bringing the several mechanisms back to their normal positions.

2. In a device of the class described and in combination with a saw table having a saw and lumber feeding rolls, and means for actuating the same, of a two part delivery table mounted on the same plane as said saw table, lumber conveying means mounted thereon and adapted to be operated from the actuating means of the feeding rolls, one of the parts of said delivery table being stationary and the other part adapted to swing downward to eject the "rips", means for normally retaining said movable table part in its raised position, means actuated by the travel of the lumber to permit said table part to swing downward, means actuated by the movement of said table part for returning the lumber to the saw table, and return said movable table part to its raised position, and means mounted on said table parts to normally act as a guide for the saw cut and to divert the returning lumber past the saw.

In testimony whereof I affix my signature.

HENRY T. LUMB.